(12) United States Patent
Carcagno et al.

(10) Patent No.: US 7,255,374 B2
(45) Date of Patent: Aug. 14, 2007

(54) THREADED TUBE JOINT

(75) Inventors: Gabriel Carcagno, Campana (AR); Rita G. Toscano, Buenos Aires (AR); Hisao Nakamura, Yokohama (JP); Tommaso Coppola, Rome (IT); Tatuso Ono, Yokomashi Kanagawa (JP)

(73) Assignee: Tenaris Connections AG, Ruggel (LI)

( * ) Notice: Subject to any disclaimer, the term of this patent is extended or adjusted under 35 U.S.C. 154(b) by 0 days.

(21) Appl. No.: 10/654,914

(22) Filed: Sep. 5, 2003

(65) Prior Publication Data
US 2004/0108719 A1  Jun. 10, 2004

(30) Foreign Application Priority Data
Sep. 6, 2002  (IT) ................ RM2002A0445

(51) Int. Cl.
*F16L 25/00*  (2006.01)
(52) U.S. Cl. .................. 285/333; 285/334
(58) Field of Classification Search .......... 285/333, 285/334
See application file for complete search history.

(56) References Cited

U.S. PATENT DOCUMENTS

| | | | | |
|---|---|---|---|---|
| 2,992,019 A | * | 7/1961 | MacArthur | 285/334 |
| 3,856,337 A | * | 12/1974 | Ehm et al. | 285/334 |
| 3,870,351 A | * | 3/1975 | Matsuki | 285/334 |
| 4,153,283 A | * | 5/1979 | Hellmund et al. | 285/334 |
| 4,384,737 A | | 5/1983 | Reusser | 285/334 |
| 4,623,173 A | * | 11/1986 | Handa et al. | 285/333 |
| 4,692,988 A | * | 9/1987 | Shulver et al. | 285/334 |
| 4,736,967 A | * | 4/1988 | Mott et al. | 285/333 |
| 4,770,444 A | * | 9/1988 | Hauk | 285/333 |
| 4,830,411 A | | 5/1989 | Tsuru et al. | 285/334 |
| 4,958,862 A | * | 9/1990 | Cappelli et al. | 285/334 |
| 4,984,829 A | * | 1/1991 | Saigo et al. | 285/334 |
| 5,064,224 A | | 11/1991 | Tai | 285/94 |
| 5,066,052 A | | 11/1991 | Read | 285/334 |
| 5,137,310 A | | 8/1992 | Noel et al. | 285/333 |
| 5,649,725 A | | 7/1997 | Nagasaku et al. | 285/334 |
| 6,045,165 A | * | 4/2000 | Sugino et al. | 285/333 |
| 6,305,723 B1 | | 10/2001 | Schutz et al. | 285/333 |
| 6,409,175 B1 | | 6/2002 | Evans et al. | 227/314 |
| 6,557,906 B1 | | 5/2003 | Carcagno | 285/333 |
| 2002/0017788 A1 | | 2/2002 | Krug et al. | 285/333 |
| 2002/0163192 A1 | | 11/2002 | Coulon et al. | 285/331 |
| 2003/0067166 A1 | | 4/2003 | Sivley, IV | 285/333 |

(Continued)

FOREIGN PATENT DOCUMENTS

CA  2128060  1/1996

(Continued)

*Primary Examiner*—David Bochna
(74) *Attorney, Agent, or Firm*—Fitzpatrick, Cella, Harper & Scinto

(57) ABSTRACT

A threaded tube joint for oil extraction industry has a trapezoidal thread and a toroidal sealing surface (11) placed at its end near the thread and engages, for sealing, a corresponding frusto-conical sealing surface (12) wherein the toroidal sealing surface (11) has a radius Rs value comprised within the range given by the formula $$\frac{E}{2Vo}\left(\frac{b}{2.15}\right)^2 \le Rs \le \frac{\delta \cdot E^2 t m_n^3 OD^2}{240\pi \cdot \sigma_{ad}^2 wt^2 (1-v^2)}\left[\frac{3(1-v^2)}{R_n^2 m^2}\right]^{3/4}.$$

7 Claims, 4 Drawing Sheets

U.S. PATENT DOCUMENTS

2003/0107217 A1    6/2003    Diagle et al. ............... 285/355

FOREIGN PATENT DOCUMENTS

| EP | 0713952 | 5/1996 |
|----|---------|--------|
| EP | 0916883 | 5/1999 |
| EP | 1020674 | 7/2000 |
| EP | 1106778 | 6/2001 |
| EP | 1203909 | 5/2002 |
| WO | 01/94831 | 12/2001 |
| WO | 2004/023020 | 3/2004 |

* cited by examiner

THREADED TUBE JOINT

BACKGROUND OF THE INVENTION

1. Field of the Invention

The present invention relates to a threaded tube joint, particularly for joining pipes used in the oil and gas extraction industry. Such pipes can be employed both as pipelines for pumping gas or oil and as linings of the wells themselves.

2. Brief Description of the Prior Art

The assembly of pipes or pipe segments to form strings used in the oil and gas industry is commonly performed using threaded joints. Most of the applications are covered by the standard connections described and specified by the American Petroleum Institute (API). These connections have limitations when subjected to extreme loading conditions that are increasingly common in oil and gas wells, especially those related with high gas internal or external pressure where the risk of leaks shall be eliminated, while resisting at the same time high mechanical loading conditions caused by tension, compression, bending or torque.

One solution provided to improve the seal resistance for oil and gas joints is the metal-to-metal seal placed at various points of the joint, depending on the joint design selected. This type of seal in a threaded joint provides a barrier to gas or liquid pressure while the thread provides mainly for the satisfaction of mechanical requirements and stabbing and running characteristics. Examples of these types of joints are the API Extreme-line. Several seal design alternatives on metal-to-metal seals have been proposed in the prior art. One of the metal-to-metal seal solutions is the one that comprises a frusto-conical annular outer seal surface located in the end of the male member of the joint, which is in contact with a corresponding frusto-conical annular inner seal surface located on the female member of the joint. Due to the tapered seal surface and the definite final assembling position, a radial interference between both surfaces is developed, which by promoting high contact stresses is a guarantee of the seal.

An important technical feature of frusto-conical sealing surfaces is the development of highly concentrated contact stresses on the edge formed by the intersection of the frusto-conical sealing surface of the male member and the cylindrical surface comprised between the seal surface and the threaded zone. The stress distribution along an axial section of a joint of the state of the art is shown in detail in FIG. 6.

The contact stress concentration can be calculated through numerical analysis, and is originated in the stiffness differences between male and female members of the joint that provoke the relative rotation of male member end. The distribution of contact stresses along the seal surface is also affected by the different loading conditions to which the joint is subjected: e.g. tension, compression, internal pressure, external pressure. The coming into existence of high contact stresses during make up, which are normally higher than nominal material yield strength, is a clear risk for galling occurrence in the joint.

When a torus-cone seal combination is used, the contact stresses on the seal surface present a distribution described by a Hertz-type function. The maximum contact stresses and the length of effective contact are related to the intensity of the contact force and the radius of the toroidal surface. The intensity of the contact force could be related to the geometrical interference between male and female sealing surfaces and the dimensions of the male member and female member of the joint.

The patent document U.S. Pat. No. 4,623,173 describes a threaded joint with a toroidal sealing surface of radius larger than 100 mm. Depending on the particular joint dimensions, i.e. its diameter and wall thickness, a sphere-cone seal with high sphere radius could present contact stresses at the seal not high enough to ensure sealing function in operation, increasing the risk of leaks under extreme conditions. On the other hand, if one wants to obviate to this drawback, the usual way to improve seal contact stresses is through the increase of the diametric interference, but this increases the level of mean stresses acting inside the joint, as well as the sliding distance travelled by the male and female members during the make up process, increasing the risk of galling.

On the other extreme, the use of a very small sphere radius is advantageous from a maximum seal contact pressure point of view, but it increases the risk of galling of the joint due to this particularly high contact stress generally higher than material yield strength. Another disadvantage of this alternative is the reduced area of the seal contact surface that could increase the risk of leaks. The non-perfect surface condition and the presence of roughness, lubricant, solid particles, etc. require a minimum length of contact with contact pressure above a minimum value.

In these joints the preferred threads are with trapezoidal profile to increase thereby the load capacity of the joint itself in case of use in very deep wells, and of the Extended Reach Wells type with very important horizontal displacements. To increase the structural resistance of the thread, several designs of joints are using a flank-to-flank contact concept, in which both the stab flank and the load flank of the threads of one of the two members are in contact with the corresponding flank of the other member during and at the end of the assembling.

One main drawback of using trapezoidal threads concept is that the contact on the stab flanks and load flanks during make up increases the risk of galling as well as the torque required, rendering the assembling operation unstable and reducing the re-utilization possibility of such joints.

SUMMARY OF THE INVENTION

The main object of this invention is to eliminate the above mentioned drawbacks by means of a joint, allowing the production of strings with excellent sealing properties for the widest range of operational conditions common nowadays, assuring optimum performance even after several assembling and disassembling operations. Another object of the invention is to provide a joint with high resistance to operation loads.

The above mentioned objects and others which will be better clarified hereafter are achieved according to the present invention by means of a threaded tube joint comprising a tube with male member threaded end portion e a tube with female member threaded end portion with substantially cylindrical walls, the male member member having a toroidal sealing surface placed at its end portion near the respective threaded portion engaging for sealing purpose, when the male and female members are in the assembled position, a corresponding frusto-conical sealing surface of the female member placed in proximity of the respective threaded portion characterised by the fact that the toroidal sealing surface has a radius $R_s$ value comprised in the range of formula:

$$\frac{E}{2Vo}\left(\frac{b}{2.15}\right)^2 \leq Rs \leq \frac{\delta \cdot E^2 tn_n^3 OD^2}{240\pi \cdot \sigma_{ad}^2 wt^2(1-v^2)}\left[\frac{3(1-v^2)}{R_n^2 tn^2}\right]^{3/4}$$

wherein:
δ=radial seal interference;
E: Material young modulus;
tn: pin nose thickness
OD: Pipe external diameter
$\sigma_{ad}$=Material yield stress
wt: pipe wall thickness
$R_n$: pin nose radius
v: Poisson's coefficient (=0.3)
b=active length of contact pressure $$Vo = \frac{\delta \cdot E t_n^3}{6(1-v^2)}\left[\frac{3(1-v^2)}{R_n^2 t_n^2}\right]^{3/4}$$

BRIEF DESCRIPTION OF THE DRAWINGS

Further advantages and aspects of the invention will become apparent from the detailed description of a preferred embodiment thereof, hereafter shown by way of non-limitative example by means of the accompanying figures wherein.

DETAILED DESCRIPTION OF A PREFERRED EMBODIMENT

Figure 1:
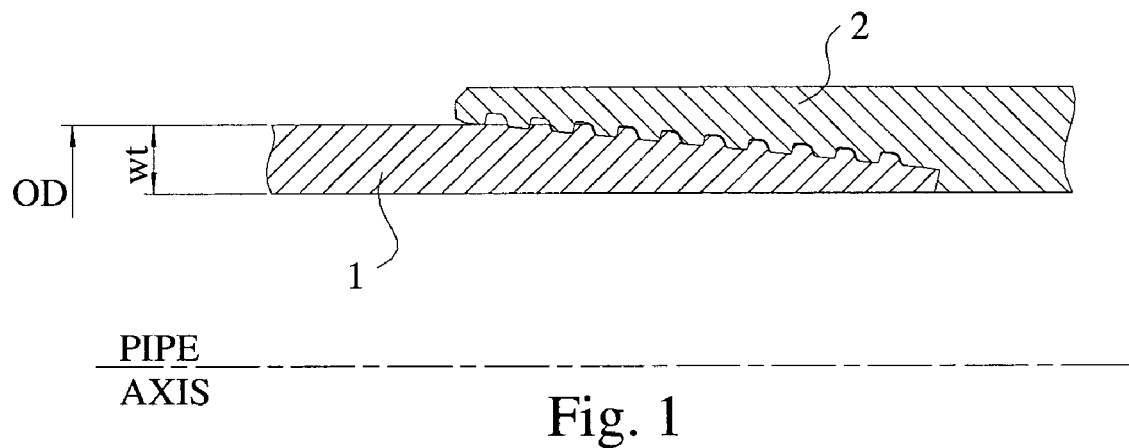
FIG. 1 shows a sectional view along a longitudinal plane of the joint according to the invention in an assembled position.
Figure 2:
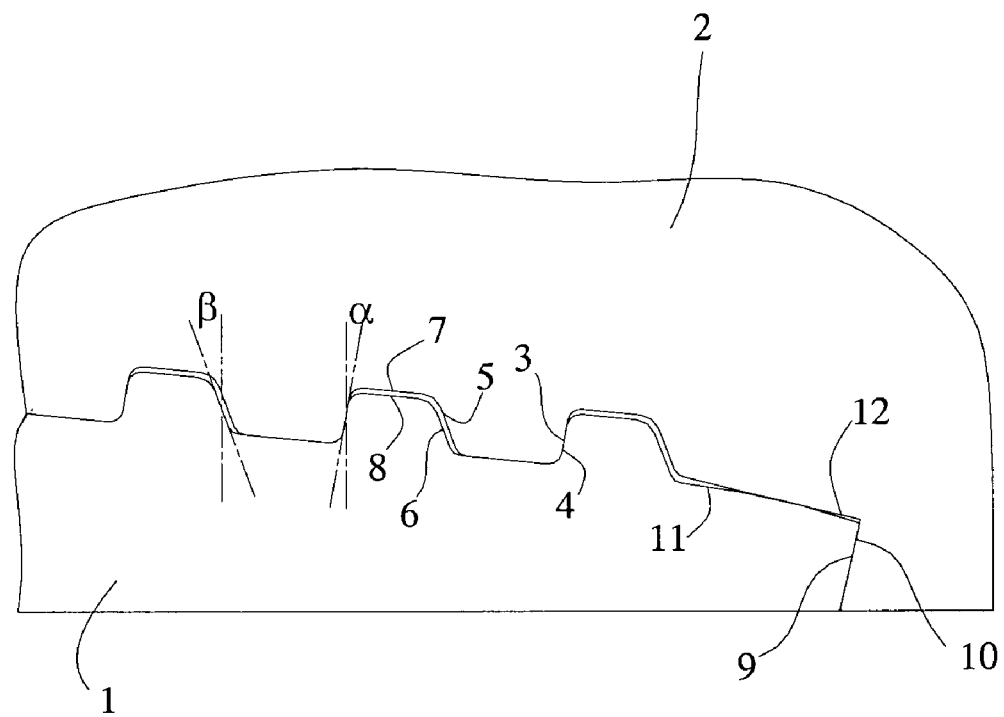
FIG. 2 shows an enlarged detail of the joint of FIG. 1.
Figure 3:
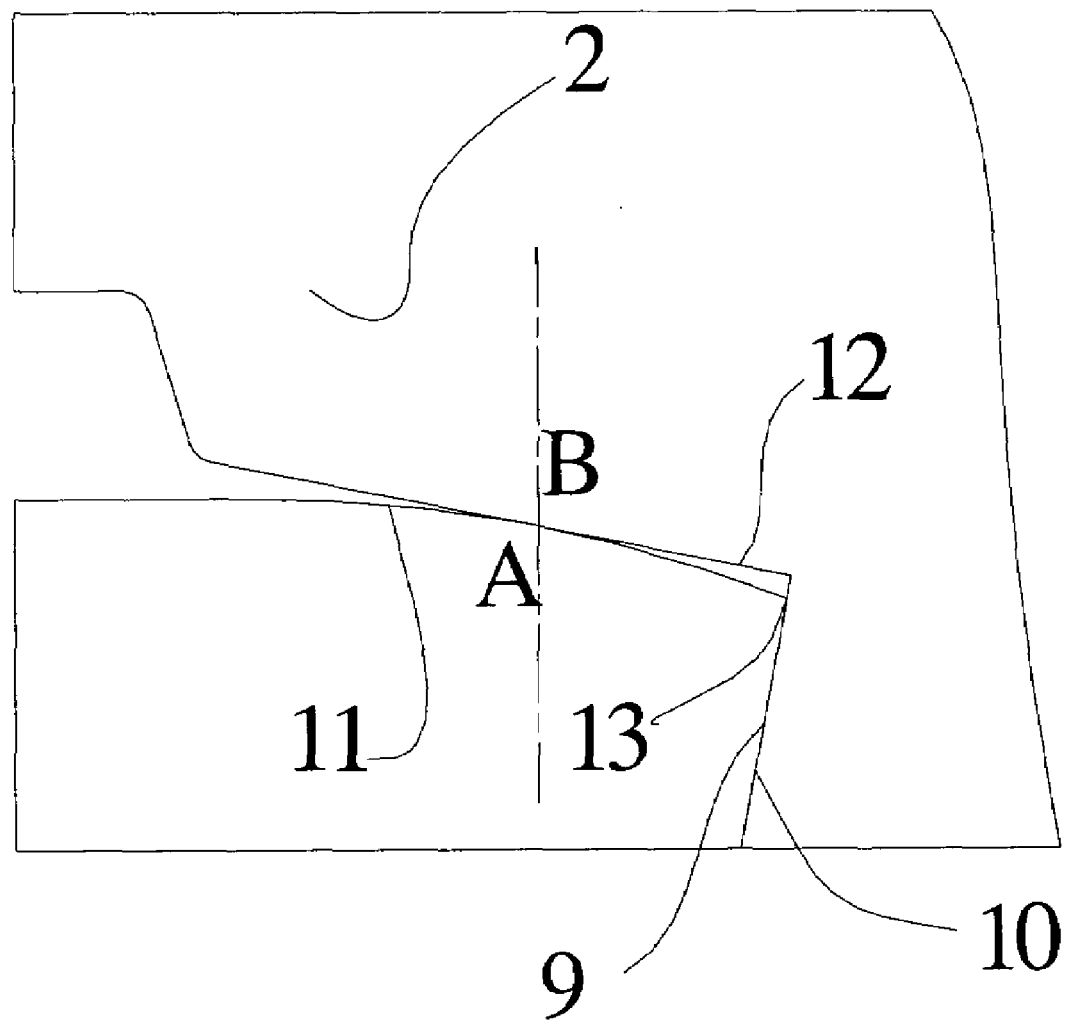
FIG. 3 shows an enlarged detail, in a bigger scale, of the seal portion of the joint of FIG. 1 in an assembled position.
Figure 4:
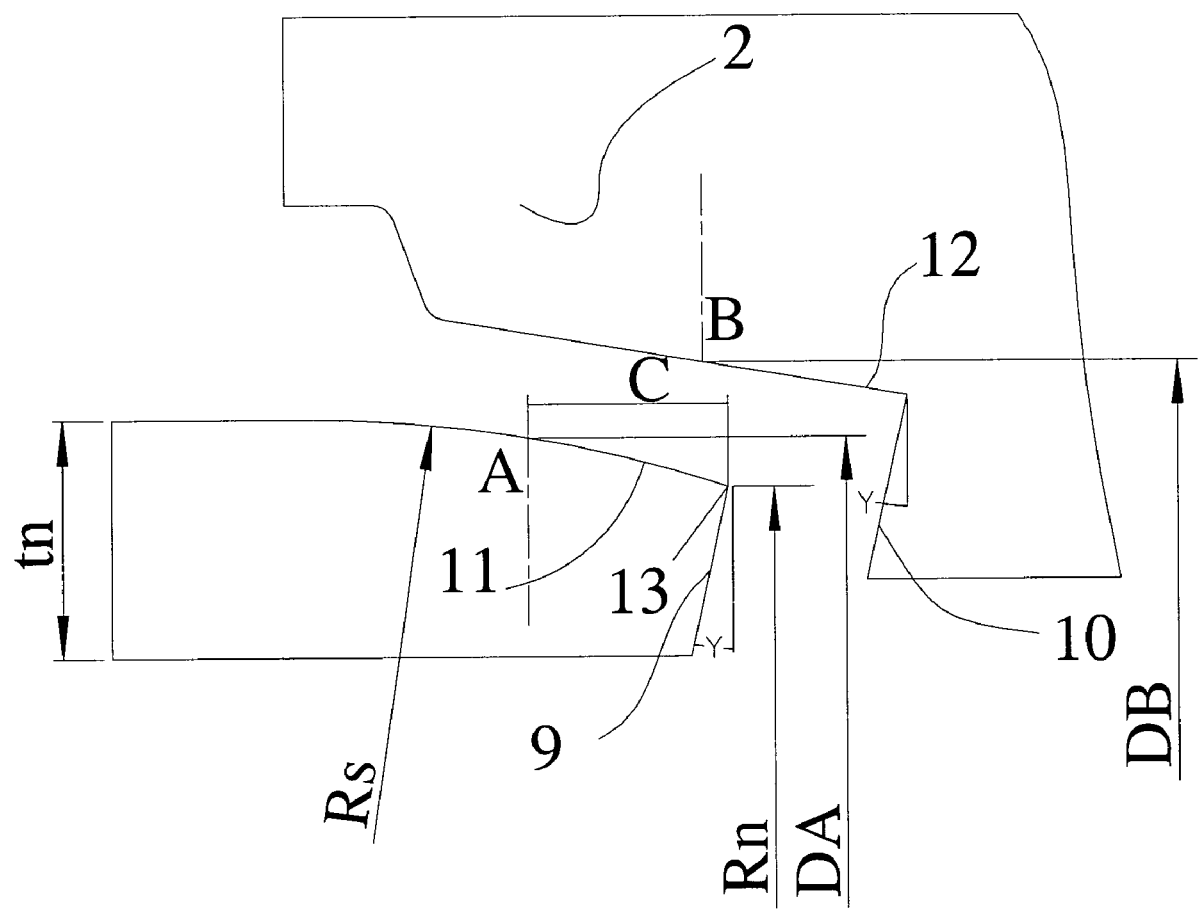
FIG. 4 shows an enlarged detail, in a bigger scale, of the seal portion of the joint of FIG. 1 in a disassembled position.

With reference to the Figures, a joint according to the present invention will be now described as a non-limiting example. The joint comprises a male member 1 provided with an external frusto-conical threaded surface at the end thereof, and a female member 2, provided with an internal corresponding frusto-conical threaded surface, placed at the end portion of a pipe or of a pipe connection sleeve. The front end of the male member comprises a concave frusto-conical abutment surface 9 axially oriented, which is pressed against a convex frusto-conical bearing surface 10 forming a shoulder of the female member, at the end of the assembling operation. An external edge 13 is defined by the intersection between the pin nose frontal concave frusto-conical abutment surface 9 and the toroidal seal surface radially oriented 11. With the joint in assembled position, the toroidal sealing surface 11 of the male member 1 comes to bear against a corresponding concave frusto-conical sealing surface radially oriented 12 of the female member 2 which is connected to the corresponding convex frusto-conical bearing surface 10 of said member.

The relative positions of the abutment surface 9 and bearing surface 10 compared to those of the corresponding sealing surface 11 of the male member and of the female member 12 are so determined that, during the make up of the two members, the contact exerted by the abutment surface 9 and bearing surface 10 defines a diametric positive interference δ defined by the difference between initial nominal diameters DA of the male member and DB of the female member in unloaded condition, between the male sealing surface 11 and the female sealing surface 12, measured in a plane orthogonal to the longitudinal axis X of the joint located at a distance C from the edge 13 of the male member. This point C coincides with the tangent point between the longitudinal sectional plane and the tangent circumferential line between the toroidal seal surface 11 of the male member 1 and the concave frusto-conical sealing surface 12 of the female member 2.

The diametric interference δ between the toroidal sealing surface 11 of male member 1 and the frusto-conical sealing surface 12 of the female member 2 is compensated through the diametric expansion of the female member 2 and the simultaneous diametric compression of the male member 1. For a given diametric interference □ the contact pressure developed between the male and the female members is related to the respective geometries. The higher the interference δ, the higher the mean contact pressure originating between the male and the female members. Normally, the diametric seal interference ranges from 0.2 mm to 1.0 mm, depending on the diameter of the joint, i.e. the larger the diameter, the higher the diametric seal interference.

The particular stress distribution on the seal surface is defined by the particular geometry of the sealing surfaces themselves. The length "b", so-called contact length, is the length axially measured on the seal surfaces 11, 12 in which the contact pressure is developed. The value of "b" is directly related with the particular design of the sealing surfaces in contact and the level of interference δ. If "b" is short, this will produce high concentrated seal contact pressure distributions, while if "b" is long, this will cause a wider distribution of lower contact stresses.

If a cylinder of radius Rs and a plane surface are in contact with a force F pressing the two members acting perpendicularly to the plane surface along the contact line, the contact pressure between both members is described by a Hertz' function, provided no plasticity occurs.

$$P_{max} = \left[\frac{E}{2\pi Rs}\frac{F}{L}\right]^{1/2}$$

where $P_{max}$ is the maximum contact pressure, E is the Young modulus, Rs is the cylinder radius, F is the contact force and L is the length of the contact line. As it can be seen, for a given material the $P_{max}$ is directly related with the cylinder radius and the contact force between the male and female members.

According to an important aspect of the invention, the maximum contact pressure developed between the sealing surfaces 11 and 12 is higher than a predefined number of times than the internal pressure of the media, e.g. gas or oil, to seal. In this manner, a minimum limit value for the maximum contact pressure developed on the seal is ensured, in order to control the seal behaviour under different loading conditions. As the contact force related to the diametric interference δ is conditioned in turn by global stresses development and geometric conditions of the assembly, the maximum contact pressure is strongly related to the choice of the maximum optimal toroidal sealing surface radius.

In accordance with the invention, the maximum radius Rs max of the male toroidal sealing surface is defined by the following relationship:

$$Rs \leq \frac{\delta \cdot E^2 tn_n^3 OD^2}{240\pi \cdot \sigma_{ad}^2 wt^2 (1-v^2)} \left[ \frac{3(1-v^2)}{R_n^2 tn^2} \right]^{3/4}$$

wherein

δ=radial seal interference;

E: Material young modulus;

tn: pin nose thickness

OD: Pipe external diameter $\sigma_{ad}$=Material yield stress wt: pipe wall thickness $R_n$: pin nose radius v: Poisson's coefficient (=0.3)

b=active length of contact pressure

The use of a toroidal seal surface with very small radius Rs is beneficial from a sealability point of view, provided the high contact pressure is critical to act as barrier for internal pressure. On the other hand, if Rs is too small the contact pressure is very high, as evident from Hertz's formula, and risky in terms of galling due to the high concentrated contact stresses, and sealability due to a very short contact length in which the contact pressures are developed.

In order to avoid the above-mentioned problems, the contact length "b" on the seal surfaces 11 and 12 in which the seal contact pressure is developed is chosen longer than a certain minimum value, which for common surface conditions and surface treatments is set at 0.5 mm. Then, according to the Hertz theory and as is shown by Finite Elements analysis, for determined conditions of the material, joint dimensions and geometrical seal interference, the male seal surface radius Rs affects directly the length along which the contact pressure between both seal surfaces is produced.

Also in accordance with the present invention, the minimum radius Rs min of the male toroidal sealing surfaces is defined by the following relationship, from Hertz' theory function:

$$Rs \geq \frac{E}{2Vo} \left( \frac{b}{2.15} \right)^2$$

Where b=active length of contact pressure, with a value of 0.5 mm, and $V_o$ is given by the following formula $$Vo = \frac{\delta \cdot Et_n^3}{6(1-v^2)} \left[ \frac{3(1-v^2)}{R_n^2 t_n^2} \right]^{3/4}$$

The following examples show values for maximum and minimum radius Rs for different typical oil pipes, using representative values for δ and $t_n$/wt, calculated by using the above formulas:

| OD | wt | Rs min | Rs max |
|----|----|--------|--------|
| 73 | 5.5 | 21 | 82 |
| 89 | 6.5 | 26 | 73 |
| 114 | 6.9 | 28 | 97 |
| 140 | 9.2 | 21 | 108 |
| 178 | 11.5 | 17 | 138 |
| 245 | 13.8 | 15 | 204 |
| 340 | 9.7 | 31 | 398 |

In case one needs to reduce the number of different seal radius for different pipe diameters, according to a preferred embodiment of the present invention two preferred radius ranges can be defined for two single pipe diameters ranges, by using the above formula.

| OD | Rs |
|----|-----|
| <140 mm | 30 < Rs < 75 |
| >140 mm | 30 < Rs < 100 |

An improvement of seal performance under different loading conditions is obtained through a advantageous embodiment of the joint where the advantages of the seal geometry described above is used in combination with a thread geometry as described hereafter.

The optimum behaviour of the joint according to the invention under tensile or compressive loads is given by using trapezoidal thread profile for male and female members 1, 2 in which the possibilities of axial relative movements between the members are minimised. In that manner, both the movement and effects on the sealing surfaces are minimised.

Figure 5:
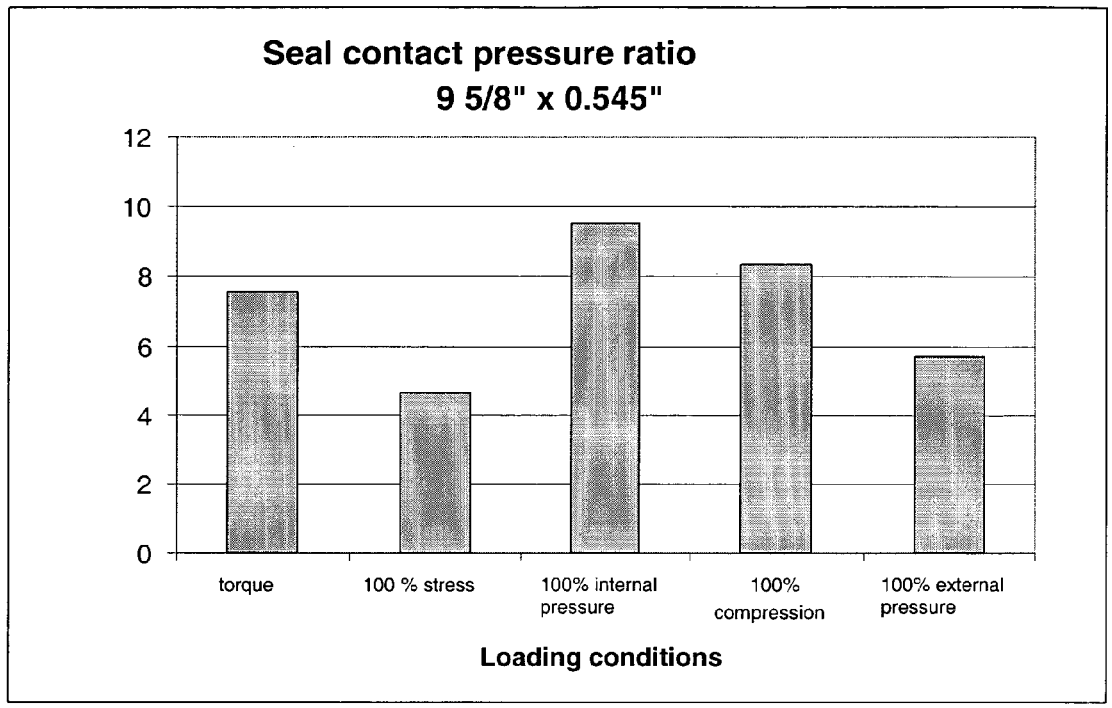
FIG. 5 shows a graph with the variation in seal contact pressure under different load conditions for a joint according to the invention.
Figure 6:
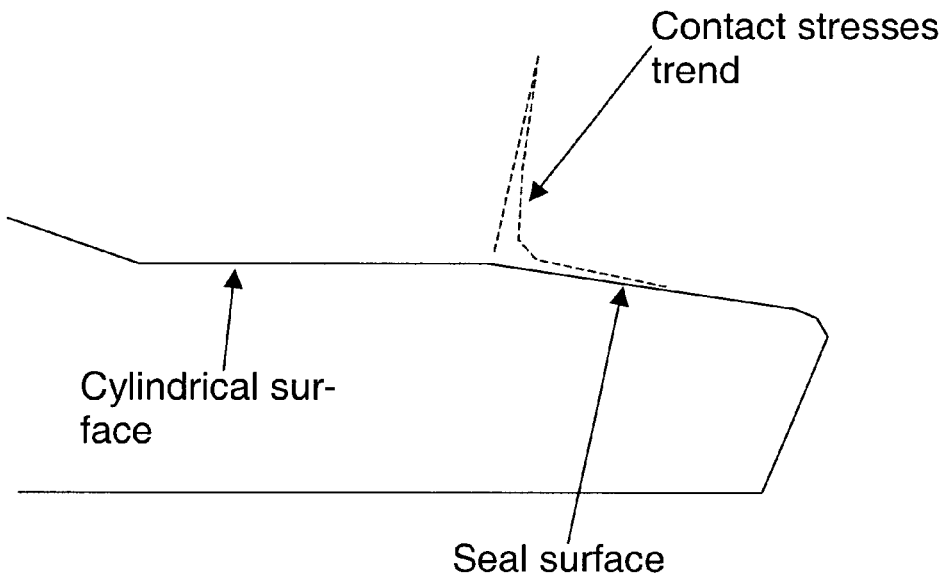
FIG. 6 shows the stress distribution in the seal portion along an axial section of a state of the art joint.

The thread is thus provided with a gap or clearance with a dimension of 0.15 mm or less between the stab flank 6 of the male member 1 and the corresponding stab flank 5 of the female member 2, in the final assembling position. Such a combination of thread with the seal according to the invention offers a joint with good structural resistance to minimise seal movements and plastic strains in the vicinity of the seal region. FIG. 5 shows the variation in seal contact pressure for a joint according to the invention, where the axis X expresses the ratio between the seal contact pressure and the maximum pressure to seal, for extreme loading conditions to 100% of material Minimum Specified Yield Limit.

A further advantage of the invention is obtained by providing the angle γ, defined by the internal shoulder 10 and abutment surface 9 and a plane orthogonal to the axis X of the joint, with a value comprised in a range from −5° to −15°. In this manner the joint of the invention eliminates the danger of producing jump-in of the seal or high deformations of the seal.

Such a range of values further has the great advantage that it prevents galling or deformation problems from occurring during make up. On one hand an angle smaller than −5° would make it likely the occurrence of a jump-in problem under high compression loads or high torques. On the other hand, angles bigger than −20° would provoke large deformations under high compression loads or high torque conditions.

The joint of the present invention can be used either when the female member is provided in a pipe end, or when a connecting sleeve with two female members at both ends is used. From what has been described it is apparent that the invention achieves all the objects set in the preamble.

What is claimed is:

1. A threaded tube joint, comprising a male threaded tube member (1) and a female threaded tube member (2) with substantially cylindrical walls, the male member (1) having a toroidal sealing surface (11) placed at its end portion near the threaded portion thereof engaging for sealing purpose, when the male and female members (1, 2) are in the assembled position, a corresponding frusto-conical sealing surface (12) of the female threaded tube member (2) placed near a threaded portion characterised by the fact that the toroidal sealing surface has a radius Rs value comprised in the range between 30 and 75 mm for a tube having an outer diameter (OD) of less than 140 mm and between 30 and 100 mm for a tube having an outer diameter (OD) of more than 140 mm, —wherein the male member (1) has a front end first frusto-conical abutment surface (9) forming a first angle ($\gamma$) comprised in a range between $-15°$ and $-5°$ with a plane orthogonal to a longitudinal axis (X) defined by the joint, and wherein the female member (2) has a complementary second frusto-conical abutment surface (10) forming a second angle ($\gamma$) of same value as the first angle.

2. The joint according to claim 1, wherein there is provided a thread with trapezoidal profile and with a clearance equal to or less than 0.15 mm between the stab flank (6) of the male member (1) and the corresponding stab flank (5) of the female member (2) in the assembled position.

3. The joint according to claim 2, wherein the male member (1) is provided in the end portion of a first pipe segment and the female member (2) is provided in the end of a second pipe segment.

4. The joint according to claim 1 wherein the male member (1) is provided in the end of a pipe segment and the female member (2) is provided in the end of a pipe connecting sleeve with two female ends.

5. The joint according to claim 1, wherein the male member (1) is provided in the end portion of a first pipe segment and the female member (2) is provided in the end of a second pipe segment.

6. A tube of definite length with a portion of at least an extremity provided with thread on the outer surface adapted to form the male member (1) of the joint according to claim 1.

7. A tube of definite length with a portion of at least an extremity provided with thread on the inner surface adapted to form the female member (2) of a joint according to claim 1.

* * * * *